UNITED STATES PATENT OFFICE.

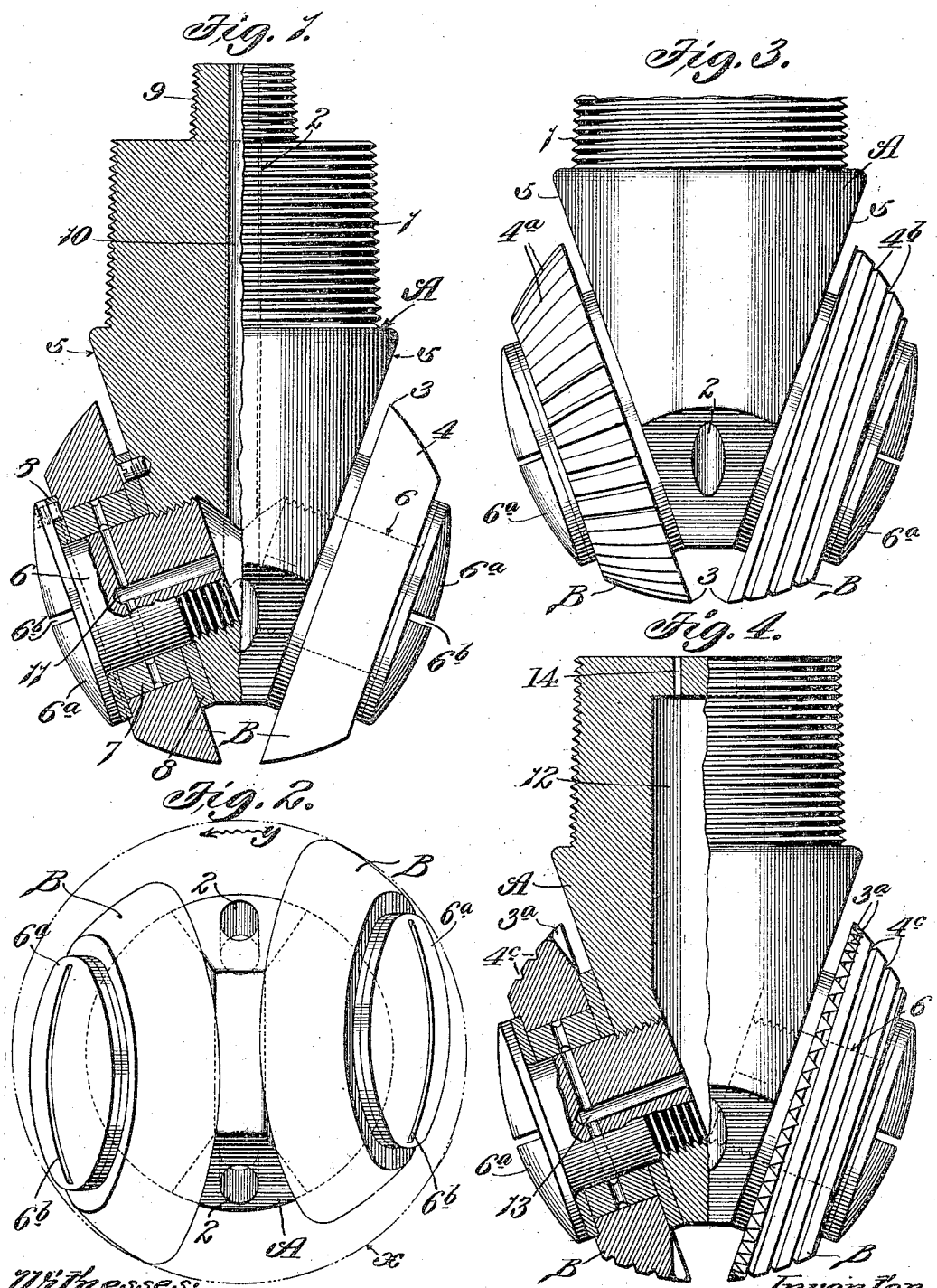

HOWARD R. HUGHES, OF HOUSTON, TEXAS.

ROTARY BORING-DRILL.

1,124,241.   Specification of Letters Patent.   Patented Jan. 5, 1915.

Application filed November 1, 1913. Serial No. 798,654.

*To all whom it may concern:*

Be it known that I, HOWARD R. HUGHES, a citizen of the United States, residing at Houston, Texas, have invented a certain new and useful Improvement in Rotary Boring-Drills, of which the following is a full, clear, and exact description, such as will enable others skilled in the art to which it appertains to make and use the same.

This invention relates to rotary boring drills of the type that are used for drilling wells, and particularly to drills of the type which comprise a head provided with rotatable cutters of substantially disk-shape that cut the material when the head rotates.

One object of my invention is to provide a strong, serviceable and inexpensive rotary drill of simple construction that is particularly adapted for drilling in comparatively soft formations such, for example, as gumbo, shale, hard clay and soft rock.

Another object is to provide a rotary drill of the type referred to in which the cutters are so arranged on the head of the drill that the weight imposed on the drill causes the cutters to crush and disintegrate the material at the bottom of the hole, and the rotary movement of the head causes the forward edges of the cutters to shear off the material at the side of the hole and thus remain sharp by rubbing constantly against the side of the hole. And still another object is to provide a rotary drill of the type referred to that can be kept thoroughly lubricated when it is in operation, and which is so designed that it will not lose its clearance by reason of the cutters becoming dull from dragging over the material without cutting same.

Other objects and desirable features of my invention will be hereinafter pointed out.

Figure 1 of the drawings is a vertical sectional view of a rotary drill constructed in accordance with my invention; Fig. 2 is a bottom plan view of same; Fig. 3 is a side elevational view of said drill showing it equipped with cutters of slightly different form from those shown in Fig. 1; and Fig. 4 is a vertical sectional view illustrating a slight modification of my invention.

Referring to the drawings which illustrate the preferred form of my invention, A designates the head of the drill which preferably consists of a block of metal provided at its upper end with a screw-threaded portion 1 for connecting the drill to the stem or tubular-shaped operating member, not shown, through which the water is introduced into the hole so as to flush out the disintegrated material. Cutters B are rotatably mounted on the head A so as to cut, crush and disintegrate the material when the head rotates, and in the preferred form of my invention as herein shown the head of the drill is provided with two cutters that are inclined in such a manner that the lower portions of same converge toward the longitudinal axis or center of the head A, but I wish it to be understood that my invention is not limited to a drill provided with two cutters. By inclining the cutters in this manner and proportioning the cutters and head so that the lower edges or lower portions of the cutters are comparatively close together, a core will not be left standing at the center of the hole. Furthermore, such a design tends to reduce the shearing strains on the spindles of the cutters and also tends to crowd or force the disintegrated material toward the center of the hole into the paths of the streams of water that emerge from the water-holes 2 in the head, the lower ends of said water-holes terminating between the cutters B, as shown in Fig. 2.

While the cutters B are substantially disk-shape, they, of course, are made thick enough so that they will be strong enough to successfully withstand the enormous weight of the drill stem that is imposed on the cutters when the drill is in operation, and in the preferred form of my invention as herein shown the edges of the cutters are backed off or tapered so that they will conform approximately to the diameter of the hole, as shown in Fig. 2. In other words, the cutters B that I prefer to use taper inwardly from the inner faces of the cutters toward their outer faces, as shown in Figs. 1 and 2, thus forming a sharp cutting edge 3 at the inner side of each cutter.

In operation, the cutting edges 3 at the forward sides of the cutters shear off the material from the side of the hole, as shown in Fig. 2, and the surfaces 4 of said cutters which lie back of or beyond the cutting edges 3, crush and disintegrate the material at the bottom of the hole. The head A is provided at diametrically opposite points with two flat surfaces 5 that incline inwardly toward the lower end of the head, as shown in Fig. 1, and the spindles 6 on which the cutters B are rotatably mounted project outwardly from the head A at right angles to the flat bearing faces 5 on the head. The head A is preferably designed in such a manner that the portions of same in which the upper ends of the flat surfaces 5 terminate project laterally slightly over the cutters, as shown in Fig. 1, and thus prevent the sharp edges of the cutters from catching on projections in the hole when the drill is being removed from the hole. The spindles 6 are offset slightly or set a trifle to one side of the center of the head, as shown in Fig. 2, so that the rear sides or edge portions of the cutters B will not drag against the side of the hole, indicated by the circle $x$ in Fig. 2, when the head is rotated in the direction indicated by the arrow $y$ in Fig. 2. In the embodiment of my invention herein shown the spindles 6 are screwed into the head A, and are provided at their outer ends with enlarged heads $6^a$ which lap over the outer faces of the cutters B and thus securely hold them in position. Bushings 7 of bronze or some other suitable material, are preferably arranged between the cutters and the spindles, and washers 8 are arranged between the cutters and the head A and between the outer faces of the cutters and the enlarged heads $6^a$ on the spindles, the heads $6^a$ of the spindles being provided with slots $6^b$ so as to enable the spindles to be screwed into and out of the head by means of a screw-driver or similar tool. The enormous weight or downward pressure which the drill stem exerts on the head A tends to force the cutters B inwardly against the bearing surfaces 5 on the head, this being due to the inclination of the cutters and also to the fact that the cutting or crushing surfaces of the cutters which act on the material, are backed off or inclined so that they will conform approximately to the circular shape of the hole, thereby forming a hole having a concave or rounded bottom. One advantage of such a design is that the shearing strains on the spindles of the cutters are reduced to a minimum, and another advantage is that there is very little tendency for the drill to wabble in the hole, owing to the fact that the bottom of the hole is of such form that the head remains centered. Probably the chief advantage, however, of my improved drill is that the cutters not only shear off the material from the side of the hole and remain sharp by constantly rubbing against the side of the hole, but they also crush and disintegrate the material at the bottom of the hole and tend to crowd the disintegrated material into the path of the flushing water, these desirable features resulting from the peculiar arrangement of the cutters and from the combined cutting and crushing surfaces with which each cutter is provided. In other words, my improved drill does not depend for its efficiency only on the keen or sharp edges on the cutters which shear off the material from the side of the hole and also dig into the bottom of the hole, but in addition to the sharp or keen edges, each cutter is provided with a crushing surface that pulverizes and disintegrates the material at the bottom of the hole when the drill is in operation. The cutters are so shaped and are so arranged on the head that the rear edges of the cutters do not rub against the side of the hole and thus become dull quickly and consequently the drill can be used for a long period without losing its clearance. The cutters can either be provided with sharp cutting edges and plain or smooth crushing surfaces 4 back of the cutting edges, as shown in Figs. 1 and 2, or, if desired, one cutter can be provided with a sharp edge 3 and with teeth $4^a$ and the other cutter can be provided with a sharp edge and a spiral groove $4^b$ back of said sharp edge or on the tapered crushing surface of the cutter, as shown in Fig. 3; or, if desired, the cutting edges of the cutters may be provided with teeth $3^a$, as shown in Fig. 4, and the tapered crushing portions of the cutters may be provided with spiral grooves $4^c$, as shown in Fig. 4, or any other preferred type of surfaces that will cut and disintegrate the material.

In the drill shown in Fig. 1 the head A is provided at its upper end with a collar 9 for supporting a lubricant-holder, not shown, and ducts 10 and 11 are formed in the head and in the spindles so as to supply a lubricant to the bearing surfaces of the cutters, thereby keeping the drill thoroughly lubricated when it is in operation.

In the form of my invention shown in Fig. 4 a pocket 12 is formed in the head so as to hold the lubricant, and ducts 13 are formed in the spindles 6 so as to conduct the lubricant to the bearing surfaces for the cutters. Water-holes 14 are preferably formed in the top of the pocket 12 so as to cause the pressure of the flushing water to be exerted on the lubricant in said pocket. In this form of my invention the spindles 6 not only act to support the cutters and retain them in operative position on the head, but they also act as closures for the pocket or chamber in which the lubricant is contained, it being necessary to remove one or both of the spindles 6 in order to fill the pocket 12 with the lubricating medium.

My improved drill is exceptionally rugged and strong because it comprises only a few parts that are large enough to successfully withstand the strains to which they are subjected when the drill is in service. It is of such simple construction that it can be manufactured at a low cost; it is very efficient for comparatively soft formations owing to the fact that the cutters shear off the material from the side of the hole and also crush and pulverize the material on the bottom of the hole; the keen edges of the cutters remain sharp owing to the fact that they are mounted on the head in such a manner that the forward edges of same rub constantly against the side of the hole; and furthermore, said cutters are so mounted that they will not drag and thus cause the drill to lose its clearance quickly, due to excessive wear of the cutters. The cutters are of such design that the hole which is formed tends to center the drill and prevent it from wabbling in the hole; and still another desirable feature of the drill is that the shearing strains on the spindles of the cutters are reduced to a minimum owing to the fact that the head and the cutters are so designed that the weight imposed on the head tends to force the inner faces of the cutters against the flat inclined bearing surfaces on the head.

Having thus described my invention, what I claim as new and desire to secure by Letters Patent is:

1. A rotary boring drill comprising a head, and approximately disk-shaped cutters rotatably mounted on the head and provided with sharp cutting edges that dig into the bottom of the hole adjacent the center of same and also shear off the material at the side of the hole, and comparatively broad crushing surfaces on said cutters that disintegrate the material at the bottom of the hole outside of the cutting zone of said sharp edges.

2. A rotary boring drill provided with approximately disk-shaped cutters that are inclined in such a manner that the lower portions of same converge toward the longitudinal axis of the drill, said cutters having sharp cutting edges and also crushing surfaces of less diameter than said sharp edges that lie outside of same and which disintegrate the material at the bottom of the hole while said sharp edges are shearing off the material from the side of the hole.

3. A rotary boring drill provided with approximately disk-shaped cutters that are inclined in such a manner that the lower portions of same converge toward the longitudinal axis of the drill, said cutters having crushing surfaces that disintegrate the material at the bottom of the hole, and also cutting surfaces that shear off the material from the side of the hole and dig into the bottom of the hole adjacent the center of same.

4. A rotary boring drill provided with oppositely disposed disk-like cutters whose lower portions incline inwardly toward the vertical axis of the drill, said cutters being so arranged that the sharp edges of same shear off the material at the side of the hole and having crushing surfaces of less diameter than the diameter of the edge portions of the cutters that act on the bottom of the hole.

5. A boring drill comprising a head provided with inclined faces that converge downwardly toward the longitudinal axis of the head, spindles projecting laterally from said inclined faces at approximately right angles thereto, and substantially disk-shaped cutters rotatably mounted on said spindles and provided with combined cutting and crushing surfaces that shear off the material at the side of the hole and also disintegrate the material at the bottom of the hole, the crushing surfaces of said cutters lying outside of and being of less diameter than the cutting surfaces that shear off the material from the side of the hole.

6. A rotary boring drill comprising a head, spindles that project outwardly and downwardly from said head, and substantially disk-shaped cutters rotatably mounted on said spindles and provided with crushing surfaces that crush and pulverize the material at the bottom of the hole and cutting edges that act on the side wall of the hole, said cutters being of greater diameter at their inner faces than at their outer faces.

7. A rotary boring drill comprising a head provided with substantially disk-shaped cutters that are inclined in such a manner that the lower portions of same converge toward the longitudinal axis of the head, said cutters having cutting edges whose advancing portions act on the side wall of the hole and one of said cutters having teeth that crush and disintegrate the material at the bottom of the hole.

8. A rotary boring drill comprising a head having a portion that is substantially V-shaped in vertical cross section, so as to form flat end-thrust-resisting bearings for the cutters, spindles that project laterally from the flat faces of said V-shaped portion, and substantially disk-shaped cutters rotatably mounted on said spindles and provided beyond or outside of their cutting edges with tapered crushing surfaces of less diameter than the cutting edges that disintegrate the material at the bottom of the hole.

9. A rotary boring drill comprising a head having a portion that is substantially V-shaped in vertical cross section, spindles that project laterally from the flat faces of said V-shaped portion, and substantially disk-shaped cutters rotatably mounted on said spindles and provided with tapered crushing surfaces that disintegrate the material at the bottom of the hole, said cutters having cutting edges that shear off the material from the side of the hole and which remain sharp by rubbing constantly against the side of the hole.

10. A rotary boring drill comprising a head, inclined disk-shaped cutters whose lower portions converge toward the longitudinal axis of the head, said cutters having cutting edges that act on the side wall of the hole and being provided with broad crushing surfaces of less diameter than said cutting edges that disintegrate the material at the bottom of the hole lying outside of the point where said edges act on the bottom of the hole, and means for discharging streams of flushing water from the lower end of the head between said cutters.

11. A rotary boring drill comprising a head having a pocket formed therein of sufficient size to hold a large quantity of lubricant, a rotatable cutter mounted on said head, and a removable spindle for said cutter that acts as a closure for the opening in the pocket through which the lubricant is introduced into same.

12. A rotary boring drill comprising a head provided with a pocket for holding a lubricant, spindles screwed into said head and acting as closures for the opening through which the lubricant is introduced into said pocket, and substantially disk-shaped cutters mounted on said spindles and being so designed that they shear off the material from the side of the hole and crush the material at the bottom of the hole, said spindles having ducts for supplying the lubricant in said pocket to the bearing surfaces for the cutters.

13. In a rotary boring drill, a head, an approximately disk-shaped cutter rotatably mounted on said head in such a manner that the advancing edge of same shears off the material at the side of the hole at a point above the bottom of the hole, and an independent cutter rotatably mounted on said head and provided with teeth for crushing and pulverizing the material at the bottom of the hole lying outside of the zone where the edge of said disk-shaped cutter acts on the bottom of the hole.

14. In a rotatable boring drill, a head, an approximately disk-shaped cutter rotatably mounted on said head for shearing off the material at the side of the hole and digging into the bottom of the hole adjacent the center of the hole, and an independent cutter rotatably mounted on said head provided with teeth for crushing and pulverizing the material at the bottom of the hole lying outside of the path where said disk-shaped cutter digs into the bottom of the hole, said cutters being inclined in such a manner that the lower portions of same converge toward the longitudinal axis of the head.

15. In a rotary boring drill, a head, and an approximately disk-shaped cutter rotatably mounted on the head and provided with a comparatively sharp edge that shears off the material from the side of the hole and with a broad crushing surface that disintegrates the material at the bottom of the hole that lies outside of the point where the edge of the cutter digs into the bottom of the hole.

16. In a rotary boring drill, a head, and an approximately disk-shaped cutter rotatably mounted on said head in such a manner that the advancing edge of same shears off the material from the side of the hole, said cutter having a crushing portion of less diameter than said shearing edge that disintegrates the material at the bottom of the hole lying outside of the zone where said shearing edge digs into the bottom of the hole.

17. A rotary boring drill provided with an approximately disk-shaped inclined cutter that has a shearing edge and crushing surface of less diameter than said shearing edge which in horizontal cross section conforms approximately to the curvature of the side wall of the hole.

18. In a rotary boring drill, a head, and a substantially disk-shaped cutter rotatably mounted on said head and arranged in such a manner that the lower portion of same inclines inwardly toward the longitudinal axis of the head, said cutter having a shearing edge and a crushing portion of less diameter than said edge and being so mounted on the head that the forward portion of said edge rubs constantly against the side of the hole and the rear portion of said edge does not drag over the side of the hole.

19. A rotary boring drill consisting of a head, a substantially disk-shaped cutter on said head whose lower portion inclines inwardly under the head, said cutter having a comparatively sharp edge that removes the material from the outer side of the hole and a crushing portion that lies beyond or outside of said sharp edge for disintegrating the material on the bottom of the hole, and a portion on the head that projects laterally beyond the edge of the cutter and prevents the sharp edge of said cutter from catching on projections in the hole when the drill is being removed from the hole.

In testimony whereof I hereunto affix my signature in the presence of two witnesses, this 27th day of October, 1913.

HOWARD R. HUGHES.

Witnesses:
 BENJAMIN ANDREWS,
 E. M. TOWNES.

Copies of this patent may be obtained for five cents each, by addressing the "Commissioner of Patents, Washington, D. C."